Figure 3:
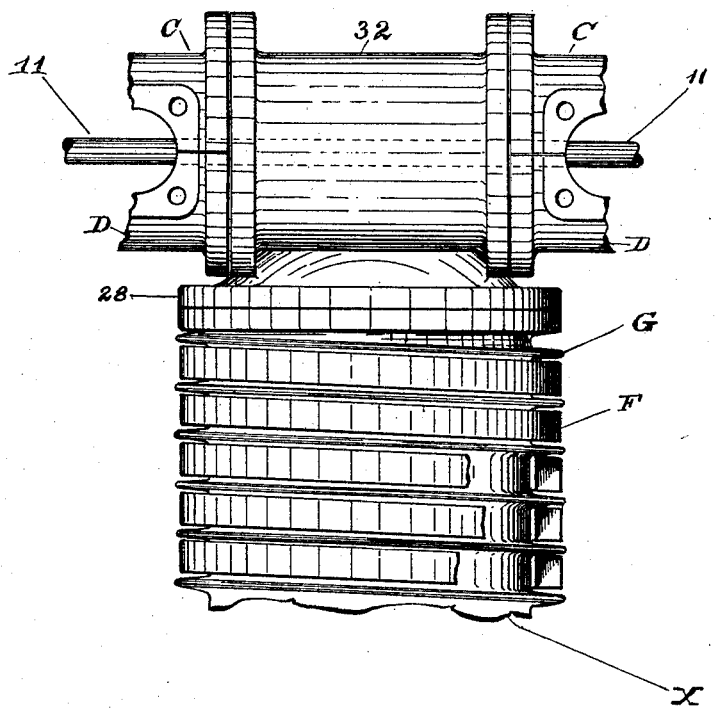

A. P. PLAUT.
VALVE MECHANISM FOR INTERNAL COMBUSTION ENGINES.
APPLICATION FILED AUG. 3, 1908.
1,006,677.
Patented Oct. 24, 1911.
3 SHEETS—SHEET 1.
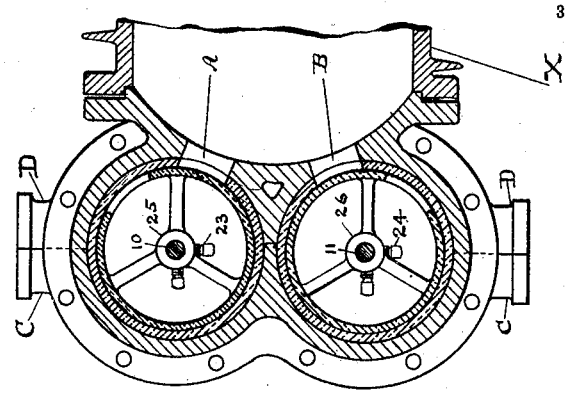
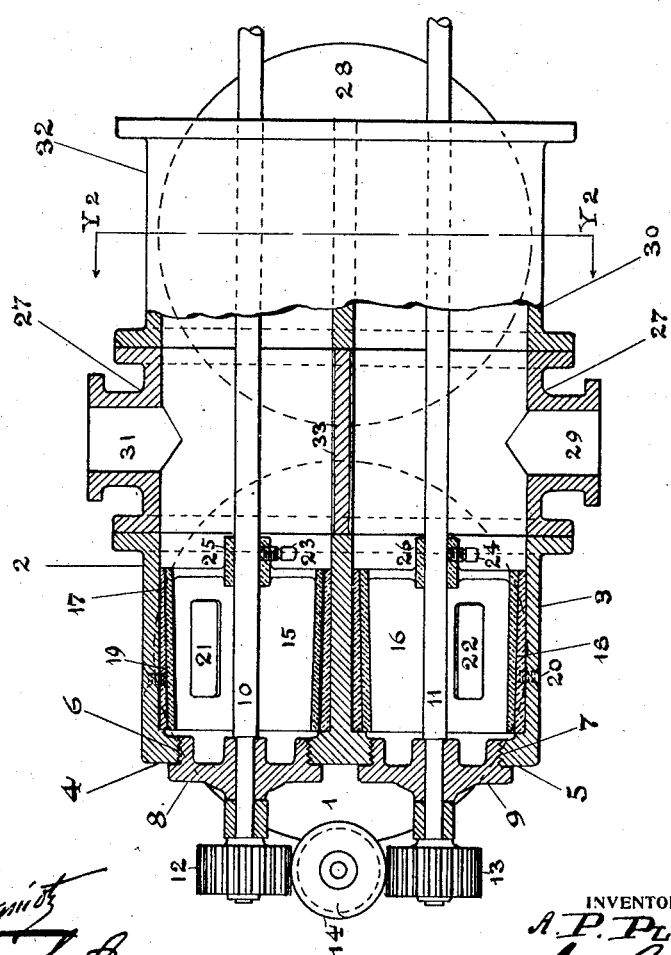

A. P. PLAUT.
VALVE MECHANISM FOR INTERNAL COMBUSTION ENGINES.
APPLICATION FILED AUG. 3, 1908.

1,006,677.

Patented Oct. 24, 1911.

3 SHEETS—SHEET 2.

WITNESSES

INVENTOR
A. P. Plaut
BY
ATTORNEY

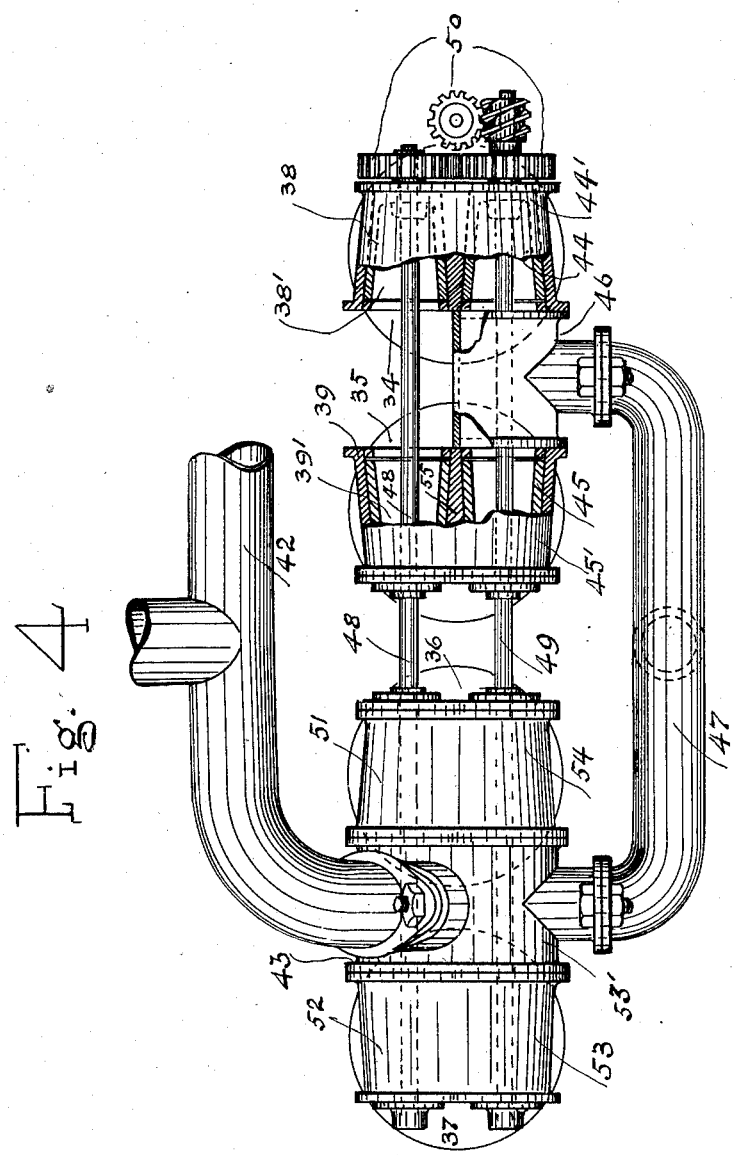

UNITED STATES PATENT OFFICE.

ANTOINE P. PLAUT, OF VENICE, CALIFORNIA.

VALVE MECHANISM FOR INTERNAL-COMBUSTION ENGINES.

1,006,677.      Specification of Letters Patent.      Patented Oct. 24, 1911.

Application filed August 3, 1908. Serial No. 446,693.

*To all whom it may concern:*

Be it known that I, ANTOINE P. PLAUT, citizen of France, residing at Venice, in the county of Los Angeles and State of California, have invented certain new and useful Improvements in Valve Mechanism for Internal-Combustion Engines, of which the following is a specification.

This invention has reference to engines operated by gas, and relates particularly to a valve mechanism for governing the motive fluid and the burned gases.

An object of this invention is to provide a mechanism for increasing the accuracy of the timing of the valves for the ingress of fresh gas and the exhaust of burned gas, without the impedance heretofore caused by the sluggish action of those classes of valves depending for their operation upon springs and other mechanical elements subject constantly to friction and wear.

This invention contemplates the abolition of all those valves, and valve constructions in a reciprocating gas engine, which, being connected with the cylinder and operating therein, or which being extraneous thereto, yet depend for their actuation upon mechanical means or the suction of the piston, constitute an inherent element to the success of explosive engines. By the elimination of this type of valve and the means of actuation therefor, such as cam shafts, valve lifters, heavy reciprocating parts, etc., and the substitution therefor of the type of valve and valve mechanism to be hereinafter described, I am enabled to construct an economical, and highly efficient engine for all purposes, but especially adapted for the motor vehicle, at a cost considerably less than that at which the engines of the present day are sold.

A further object of this invention is to provide a valve mechanism, the individual units of which may be multiplied indefinitely, according to the number of cylinders, and to control all of the valve units for the intake and the exhaust by one common and positive rotary means, completely isolated from the cylinders.

Another object of this invention is to provide a means for avoiding what is commonly known as "wire drawing" or back pressure from exhaust gases, by providing for the escape of the gases from the cylinder in a direct and unobstructed path into the exhaust pipe.

With these and other objects in view, this invention consists of the features, details of construction, and combination of parts, as will be described in connection with the accompanying drawings, and then be more particularly pointed out in the claims.

In the drawings, Figure 1, is a plan view, one unit and sleeve connection being shown in horizontal section. Fig. 2, is a vertical section on lines $y^2-y^2$, Fig. 1, showing the valves, the bushings, and the containing casings for the valves. Fig. 3, is a fragmentary elevation, showing the fragment of a cylinder provided with the valve casings, fragments of the connections for multiplying the valve units, and the thermo-siphon cooling system, and Fig. 4, is a plan view showing the disposition of the valves and their respective casings on four cylinders, one series of valves being shown in section. The manifold for the inlet and a fragment of the manifold for the exhaust is also shown.

Special reference being had to the drawing, 1, designates a cylinder head provided with an intake port A, and an exhaust port B, and having formed thereon two chambers or casings 2 and 3, one of said chambers or casings, namely 2, being for fresh gas, and the other, namely 3, being for burned or exhaust gas. The end walls, 4 and 5, of the casings, are provided with threaded orifices, 6 and 7, arranged to receive caps, 8 and 9, which form bearings for two shafts, 10 and 11, disposed horizontally within said casings, 2 and 3. Upon the ends of the shafts, 10 and 11, outside of the casings, are mounted cog wheels, 12 and 13, to which rotary motion is transmitted through a worm, 14, interposed between said cog wheels, which worm is connected by any suitable means to a rotating part of the engine. Mounted upon said shafts, 10 and 11, are valves, 15 and 16, tapering toward one end, and incased in bushings, 17 and 18, which are secured against movement by set screws, 19 and 20. The conical formation of the valves, 15 and 16, is given to insure a snug contact with the bushings, thereby to prevent all possible leakage of any of the fresh gases coming from the carbureter. These valves are self-grinding and self-adjusting by reason of their conical formation and their individuality and also by reason of their being mounted upon the shafts in such manner as to have movement longitudinally relatively thereto. The pressure of the exhaust gases on the exhaust side and the velocity of the fresh gases or incoming charge on the intake side, forces the valves in their respective seats. And this action is only obtainable and possible by employing a valve member constructed and arranged as described, namely, in a conical fashion. This positive and constant exertion of the forces produced by the pressure of the exhaust and incoming gases, is insured in a more efficient manner by disposing the valves with their larger ends facing each other, so that the pressure of the exhaust and incoming gases acts on both valve members in a uniform degree and at the same time. In addition, this provision permits of the use of a single exhaust and inlet for two exhaust valves and two inlet valves belonging to or made a part of two cylinders. These valves at one point in the cylindrical circumferences thereof, are provided with ports, 21 and 22, arranged to register with the ports, A and B, in the cylinder head. The circumference of the valves must be calculated, so that the valve ports can be timed to open, communicate with the interior of the cylinder, and close the cylinder ports in accordance with the cycles of a gas engine. In order, however, to insure perfect accuracy in this respect, and to establish absolute synchronism of the intake and the exhaust controlling valves with the beginning and the completion of a cycle, I provide for the adjustability of the valves by employing set screws, 23 and 24, extending through the hubs, 25 and 26, of the valves.

The casings, 2 and 3, containing the rotary inlet valve, 15, and the rotary exhaust valve, 16, as is obvious, from Fig. 1, of the drawings, an integral unit, adapted to be fixed in any manner to the upper part of a cylinder, whereby the entire valve mechanism is isolated. By thus isolating the valve casings and the parts appurtenant thereto and connected therewith, I am enabled to cool the cylinder heads, be it by the air-cooling method on account of the large surface area of the valve casings exposed outside of the cylinders, or by the water-cooling method through jackets which are conveniently and readily made an integral part of the valve casings, because of their complete isolation from the cylinders. It will be noted that the entire valve mechanism and the housings or casings therefor are wholly extraneous to the cylinders or the heads thereof, irrespective of the fact that the said valve mechanism may be formed integral with the head.

To provide for readily multiplying the units in multiple cylinder engines, an intermediate connection, 27, is employed, which connection is bolted or otherwise secured to the cylinder head, 1, and the cylinder head, 28. Said connection is substantially a pipe forming a passage way and made in section, C and D, as seen in Fig. 2, for the purpose of ready disassociation and inspection or adjustment. I have used the term "pipe," for want of a better, as designating the passage which connects the various valve casings with each other. In some instances this pipe may be omitted from the exhaust side of the valve and the burned gases allowed to escape directly into the atmosphere, as in racing machines where all back pressure due to the muffling down of the force of the explosion within the cylinders must be eliminated. This ring or connection, 27, has an opening, 29, on one side communicating with a muffler, not shown, whereby the exhaust gases are exhausted from the exhaust casings or chambers, 3 and 30, and also an opening, 31, on the opposite side, having communication with a carbureter, not shown. The inlet valve-chambers, 2 and 32, and the opening 31, leading from the carbureter, are isolated from the exhaust valve chambers, 3 and 30, and the opening, 29, for the burned gases, by a partition wall, 33. The intermediate connection, 27, forms but a passage way for the motive fluid and the exhaust gases, when the valve units are connected in multiple, the bores thereof being of the same diameter and communicating with the bores of the adjacent valve chambers, or valve containing casings, mounted upon successively alined cylinders, in substantially the form shown in Fig. 3, in which, however, the fragment of only one cylinder has been shown.

In Fig. 3, I have shown a means for utilizing the thermo-siphon principle for absorbing the heat generated within the cylinders, whereby to prevent overheating. This means consists in winding about the cylinder or cylinders, a hollow coil, F, the individual convolutions of which, lie between the fins or flanges, G, with which the cylinders are customarily provided. In this manner the absorption of the heat by the water or cooling medium is aided by atmospheric absorption caused by induced currents of air circulating between the fins or flanges. The coil is connected to a tank or reservoir, not shown, so that the cold water entering at the bottom of the coil, becoming heated, rises in its traverse through the convolutions of the coil, and finally returns to the main supply tank, where it is again cooled previous to its return through the coil.

Fig. 4, represents the valve mechanism assembled on a four cylinder gas engine, the cylinders being shown at 34, 35, 36, and 37. In that view, the casings or valve chambers 38 and 39 of the cylinders 34 and 35 are shown broken to disclose the valves 38' and 39' housed therein. These valves, are as shown, in direct communication with the atmosphere, that is to say, have no connection with the manifold exhaust pipe 42, or with a muffler, a provision desirable in racing machines. Neither are their casings interconnected as those on the cylinders 36 and 37 by a passage or pipe as shown at 43. The casings 44′ and 45′ of the intake valves 44 and 45, however, are joined by a passage or pipe 46 which affords a single inlet means for two inlet valves of two adjacent cylinders, and this passage or pipe 46 is connected with the induction pipe 47. The pipe 53′ intermediate the housings 53 and 54 for the intake valves on the cylinders 36 and 37 are also connected to the induction pipe 47, through which the carbureted air or mixture is supplied to all of the intake valves. As in the construction shown in Fig. 1, the exhaust and inlet valves are mounted on shafts 48 and 49, to which rotary motion is imparted by the gearing shown at 50. The passage or pipe 43 mounted intermediate and connecting the exhaust valve casings 51 and 52 mounted on the cylinders 36 and 37, is connected with the manifold 42, while on the other side the valve casings 38 and 39 housing the exhaust valves 38′ and 39′, are as above explained, unconnected and free to permit of the immediate direct and unimpeded egress of the exploded gases from the cylinders to the atmosphere. All of the exhaust valves are separated from each other and all of the inlet valves are isolated, and again all of the exhaust valves are isolated from all of the inlet valves by a partition wall 55. One of the chief objects for the distribution of the valve units in the manner described and illustrated, is to accomplish the quick, and by quick is meant the immediate and unimpeded exhaust and inlet of the gases. It is a well known fact that the explosion of the gases within the cylinders is the power developing agent in a combustion engine, and that the expansion of the gases after the occurrence of the explosion is, as far as kinetic energy is concerned, of little value as an assistant to the propulsion of the pistons. At the time of the exhaust, the gases are still burning and expanding, and the combustion of the carbon particles contained in the unconsumed mixture produces heat which is absorbed by the exposed surfaces to such an extent that the metal inclosure for the cylinder valves becomes excessively hot and requires cooling. I have sought to eliminate this necessity by reducing to the smallest possible degree the area of the individual valves, and connecting each pair of corresponding valve elements with a pipe or passage, which pipe or passage, however, does not affect the operation of valves on the exhaust side. By this arrangement therefore, the exploded gas, being freed from the cylinder when the ports are in register, enters into the exhaust valve, but on account of the very limited area of the same, the gas being still in *statu nascendi*, cannot remain even for a limited time within the valve, and the subsequent expansion and final combustion of the hydrocarbon particles occurs if at all within the passage or pipe connecting the valves in pairs. In this passage the final combustion and expansion of the gases may conclude, and the heating of this passage is immaterial since it performs no active function. Under these conditions, the provision of a cooling jacket around the valve casings or the subjection of the same heads to a forced draft, is rendered unnecessary.

The form shown in the drawings, is only a preferable form, adopted for the purpose of illustration, but it will be understood that this invention is susceptible of infinite modifications and changes, without departing from the spirit of this invention.

What I claim, is:

1. In combination with an internal combustion engine having multiple cylinders, a valve mechanism comprising separated exhaust and inlet valve casings for each cylinder, a shaft extending through said exhaust casings and through said inlet casings, individual rotary conical valves within said casings and mounted on said shafts to have longitudinal adjustment relatively thereto, means to operate said shafts, and an exhaust and inlet pipe to connect the valve casings of each cylinder.

2. In combination with an internal combustion engine having multiple cylinders, a casing for each such cylinder divided into two chambers and provided with ports, a shaft extending through each such chamber, rotary valves mounted on said shafts to have adjustment relatively thereto, said valves being isolated from the cylinders and provided with ports arranged to register with the ports in said chambers, a connection for said casings forming a single inlet and a single outlet for two such chambers, and means to operate said valves.

3. In combination with an internal combustion engine having multiple cylinders, a head arranged to be fixed to each such cylinder, said head having integral therewith an exhaust and an inlet casing, a connection for said casings forming a single exhaust outlet and a single gas inlet for two such casings, rotary conical valves journaled within said casings, said valves being disposed with their larger ends toward each other, and means to operate said valves.

4. In combination with an internal combustion engine having multiple cylinders, a head arranged to be fixed to each such cylinder, said head having integral therewith separated exhaust and inlet casings, rotary conical valves journaled within said casings, shafts to rotate said valves, means to adjust said valves on said shafts relatively to said casings, and a connecting pipe for said casings forming a direct outlet for the exhaust and a direct inlet for the inlet of two such valve casings for two cylinders.

5. In combination with an internal combustion engine having multiple cylinders, a head arranged to be attached to each such cylinder, said head having integral therewith separated exhaust and inlet casings provided with ports communicating with the interior of the cylinders, shafts extending through said casings, tubular conical elements within said casings and mounted on and movable relatively to said shafts and casings, said elements open at both ends having their larger ends disposed toward each other, and being provided with ports which are arranged to register with the ports in said casings, a passage between two of said casings and arranged to connect them in multiple, said passage forming a single outlet and inlet for the gases, and means to operate said elements.

6. A valve mechanism comprising a head for internal combustion engines having separated exhaust and inlet valve casings provided with ports, shafts extending through said casings, conical tubular valves, one for each casing, movably mounted on said shafts, and provided with ports arranged to register with the ports in said casings, said valves being disposed with their larger ends toward each other and being pressure balanced by the inrushing gases on the one side and the centrifugal force on the other side, a connection for said casings forming a common exhaust and inlet for two such casings, and means to operate said valves.

7. In combination with an internal combustion engine having multiple cylinders, a head arranged to be attached to and form an isolated unit of each such cylinder, said head having integral separated exhaust and inlet chambers provided with ports communicating with the interior of such cylinders, shafts extending through said heads and free of said chambers, bushings secured in said chambers, tubular conical elements in said bushings and mounted on said shafts to have adjustment relatively thereto and to said bushings, a passage between two of said heads and forming a single outlet and a single inlet for the gases in two of said chambers, and means to operate said shafts.

8. A valve mechanism for internal combustion engines having multiple cylinders, comprising heads arranged to be fixed one to each cylinder, said heads being severally provided with two isolated chambers forming an exhaust chamber and an inlet chamber, both chambers having ports arranged to communicate with said cylinders, bushings in each of said chambers, a shaft extending through all of said inlet chambers, and a shaft extending through all of said exhaust chambers, conical hollow shells within said bushings and mounted on said shafts to have movement relatively thereto, said shells being open at both ends and forming valves, the larger ends of which are disposed toward each other, pipes connecting the chambers of one head with the chambers of another head, whereby to form a single chamber for two exhaust valves, and a single chamber for two inlet valves, and means to operate said shafts.

In testimony whereof I affix my signature in presence of two witnesses.

A. P. PLAUT.

Witnesses:
   E. Somke, Jr.,
   E. Moquenguioc.

---

Copies of this patent may be obtained for five cents each, by addressing the "Commissioner of Patents, Washington, D. C."